Figure 1:
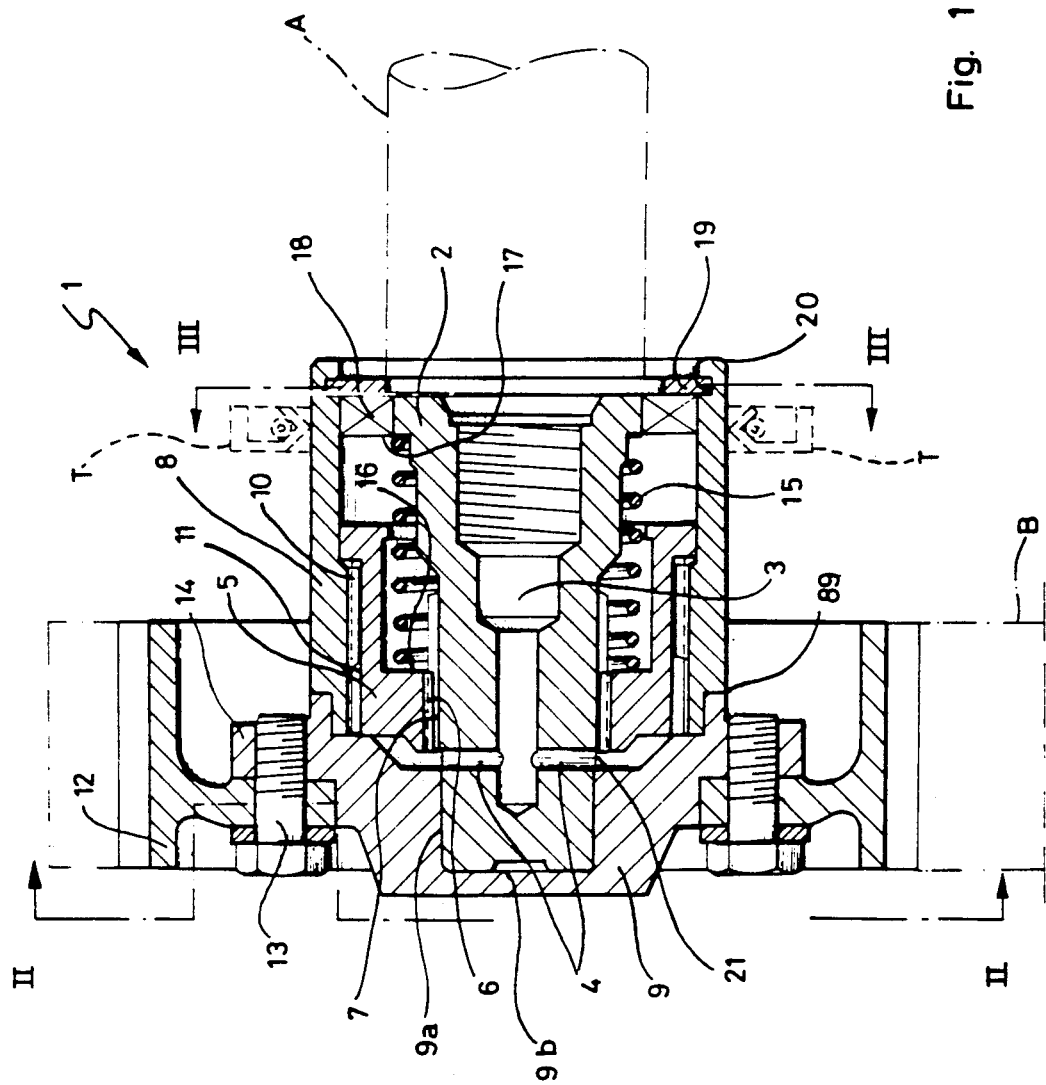

United States Patent [19]

Tortul

[11] Patent Number: 5,143,032
[45] Date of Patent: Sep. 1, 1992

[54] TIMING VARIATOR, PARTICULARLY FOR CHANGING THE RELATIVE TIMING BETWEEN A CAMSHAFT AND THE TIMING DRIVE MECHANISM OF AN INTERNAL COMBUSTION ENGINE

[75] Inventor: Renzo Tortul, San Pier D'Isonzo, Italy

[73] Assignee: Carraro S.p.A., Italy

[21] Appl. No.: 545,021

[22] Filed: Jun. 28, 1990

[30] Foreign Application Priority Data

Jun. 28, 1989 [IT] Italy .............................. 41642 A/89

[51] Int. Cl.⁵ .............................................. F01L 1/34
[52] U.S. Cl. .............................. 123/90.17; 123/90.31; 464/2
[58] Field of Search ............... 123/90.15, 90.17, 90.31; 464/2

[56] References Cited

U.S. PATENT DOCUMENTS

| | | | |
|---|---|---|---|
| 4,811,698 | 3/1989 | Akasaka et al. | 123/90.31 |
| 4,960,084 | 10/1990 | Akasaka et al. | 123/90.17 |
| 4,976,229 | 12/1990 | Charles | 123/90.17 |

FOREIGN PATENT DOCUMENTS 62-3112  1/1987  Japan .............................. 123/90.17

*Primary Examiner*—E. Rollins Cross
*Assistant Examiner*—Weilun Lo
*Attorney, Agent, or Firm*—Sughrue, Mion, Zinn, Macpeak & Seas

[57] ABSTRACT

The solution described enables the provision of a timing variator with internal circulation of the working servo-medium, while ensuring firm retention and centering ability relatively to the driving shaft (A).

12 Claims, 3 Drawing Sheets

TIMING VARIATOR, PARTICULARLY FOR CHANGING THE RELATIVE TIMING BETWEEN A CAMSHAFT AND THE TIMING DRIVE MECHANISM OF AN INTERNAL COMBUSTION ENGINE

DESCRIPTION

This invention relates to a device for changing the relative angle between rotary members, briefly a "timing variator", which has the characteristics set forth in appended claim 1.

Timing variators of this kind are currently used to selectively change the timing of a camshaft in the timing system of an internal combustion engine relatively to the crankshaft rotational timing during operation of the engine.

Long known, e.g. from the Applicant's production line, have been timing variators of the above-specified type which are mainly intended for oil-bath operation within the cylinder head cover of the engine and to transmit the movement through a chain drive.

With other timing systems, wherein the movement is transmitted to the camshaft by means of a cog or toothed belt, for example, there exists the need for timing variators which can operate outside the engine in a dry condition (that is, not under a bath of oil), without this originating problems with the sealing of the fluidic servo-medium employed to operate the variator and involving the need for more complicated component parts than those used in the construction of traditional (oil-bath) timing variators.

This invention has for its object the provision of a timing variator of the type specified above, which can fill said demands ideally.

According to this invention, this object is achieved thanks to a timing variator having the further characteristics set forth in claim 1.

Figure 3:
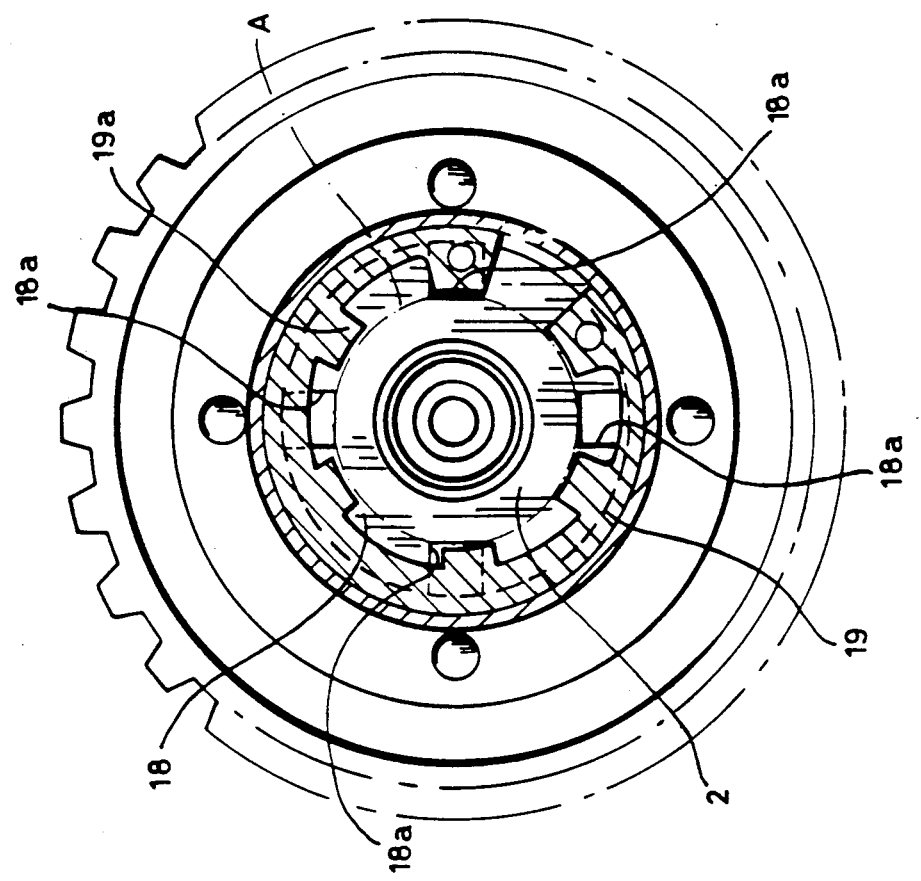
Figure 2:
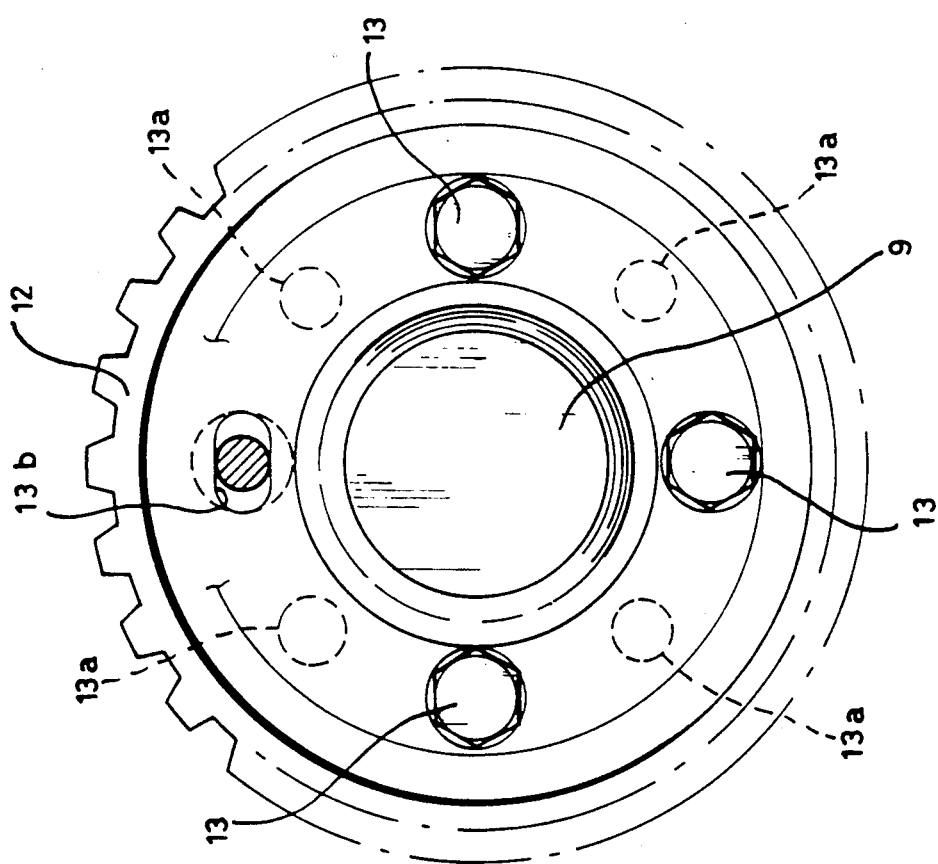
Figure 4:
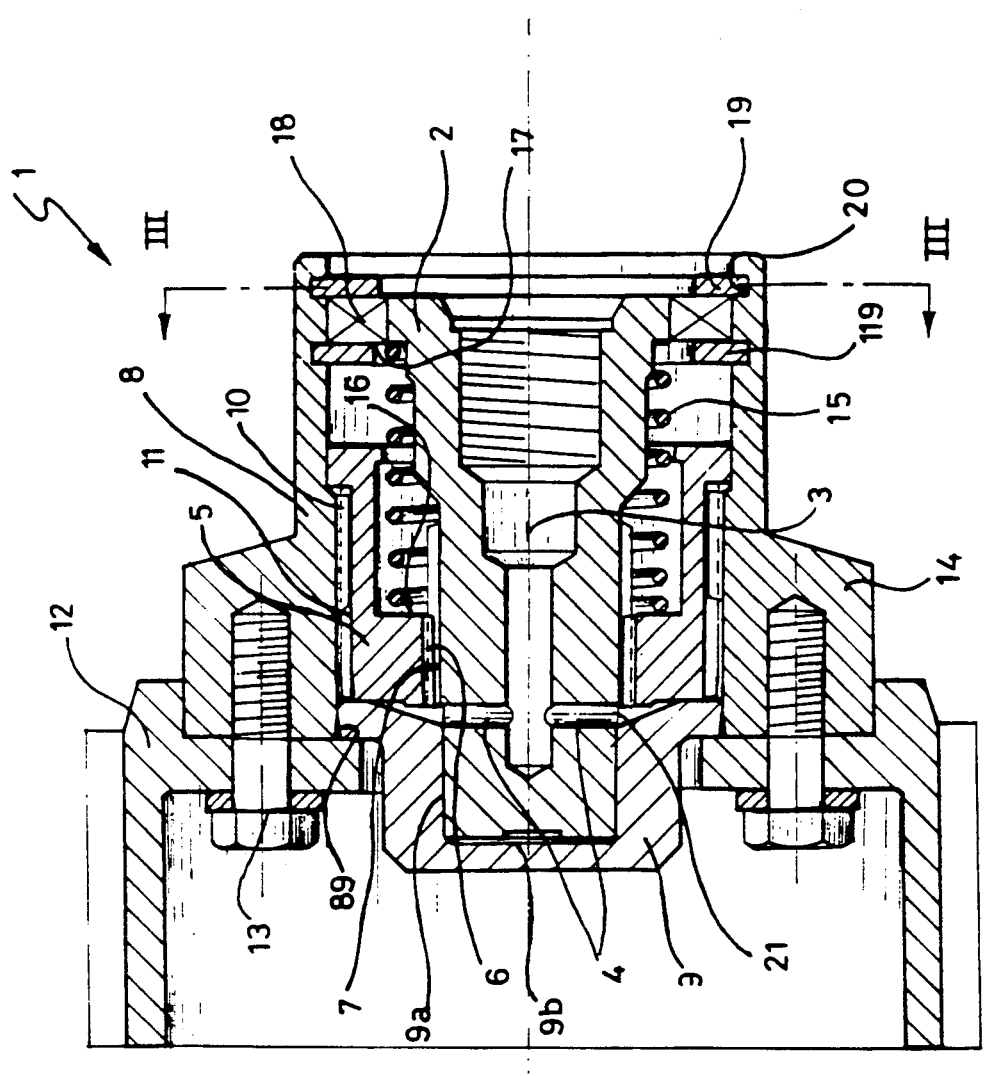

The invention will be now described, by way of non-limitative example only, with reference to the accompanying drawings, where:

FIG. 1 is an axial section view of a timing variator according to the invention, FIG. 2 is a view taken along the line II—II in FIG. 1, FIG. 3 is a sectional view taken along the line III—III in FIG. 1, and FIG. 4 is an axial section view of a modified embodiment of the timing variator shown in the preceding Figures.

Throughout the accompanying drawings, the reference numeral 1 generally denotes a timing variator device adapted to fit between a camshaft A of an internal combustion engine (generally not shown as such) and a timing belt (typically a cog or toothed belt of rubber) B which controls the engine timing system.

The timing variator 1 should be fitted to the shaft A through a hub 2 adapted to be secured (typically by thread engagement) on the end of the shaft A. The hub 2 is through-penetrated by an axial conduit 3 for supplying oil or another servo-medium under a pressure, which conduit branches out into several radial distribution conduits 4 to perform the timing control functions to be explained.

An annular plunger 5 is fitted over the hub 2, specifically a cylindrical portion thereof, such that it can perform a certain axial sliding movement over a certain section of the cylindrical end of the hub 2. That portion of the hub is provided with axial splines 6 constituting what may be termed a linear tooth formation; in a complementary way, the plunger 5 is provided internally with similare splines 7 forming a complementary linear toothing meshing with the splines 6.

The assembly of the hub 2 and plunger 5 is surrounded by a case, substantially consisting of a cylindrical shroud 8 (on the outer surface whereof there act seal means schematically indicated at T and pertaining to the engine) which envelops the plunger 5, and of an end cover or cap 9 which closes the shroud 8 on the opposite side from the shaft A and receives, inside a respective axial blind hole 9a closed by a bottom wall 9b, the free end of the hub 2 while also confining, with respect to the homologous end of the plunger 5, an annular chamber 21 to which the conduits 4 open. This constructional approach, additionally to prevent any axial sliding of the case 8, 9 relatively to the hub 2, can give full assurance of the variator case being fully sealed from the oil (servo-medium) being supplied into the chamber 21 without requiring the use of seals. The cap is connected to the shroud 8 so as to form a unitary construction typically by a laser weldment along the outward leg 89 of a toroidal connecting surface having a stepped profile defined by respective complementary shoulders.

This solution makes for easier assembling of the case, in particular more convenient laser welding. At the same time, the generally stepped design of the surface between the shroud 8 and the cap 9 defines a means of centering the same.

The shroud 8 is provided, on the inner surface facing the plunger 5, with a long-pitched helical toothing 10 which meshes with a complementary toothing 11 provided on the outer surface of the plunger 5.

Entrainment of the belt B results in a rotation of the cog or toothed wheel 12 which consists substantially (see front view in FIG. 2) of an annular ring which encircles the cap 9 and is connected thereto by screws 13 passed through slotted holes 13b and being engaged in corresponding holes provided in a peripheral flange 14 of the cap; further holes 13a are provided in the flange 14 to serve as engagement formations for a tool (wrench) during assembly of the variator 1 to the shaft A by thread engagement.

The slot-like shape of the holes 13b is useful to allow of adjustment of the initial timing of the toothed wheel 12 with respect to the camshaft A.

Shown at 15 is a coil spring fitting around the hub 2 and having its ends in respective abutment relationship with an inside shoulder 16 on the plunger 5 and an outside shoulder 17 on the hub 2. Thus, the spring 15 will tend to bias the plunger 5 in a direction of maximum spacing from the end of the timing variator facing the camshaft A.

Generally shown at 18 is a radial flange placed at the base of the hub 2 to produce a centering action of the shroud 8 relatively to the hub 2.

In the flange 18 there are formed a series of radial openings 18a arranged to discharge servo-medium (oil) which may have leaked past the plunger 5. Finally, there is shown at 19 a split retainer ring, adapted for radial compression, which engages in a groove 20 provided in the inner surface of the shroud 8. The ring 19 provides a firm action of constraint on the hub 2 and the members associated therewith with respect to the outer case 8, 9 of the timing variator. In practice, an axial sliding movement of the outer case 8, 9 relatively to the hub 2 is prevented by the ring 19 in one direction and the bottom wall 9b of the cap 9 in the opposite direction; at the same time, the case is supported on the hub 2 at its free end, received in the blind bore 9a, at one end, and at the flange 18, at the opposite end.

Thus, as shown best by the view of FIG. 3, the ring 19 is provided internally with radial lugs 19a, of which the free ends extend over a reduced distance (about 0.6 mm) with respect to the outer surface of the shaft A. In this way, with the variator mounted to the shaft A, the risk is positively avoided of the ring 19 being drawn in and coming out of its seat 20.

The operating position shown in FIG. 1 corresponds to a condition of predetermined relative angular setting (timing) between the camshaft A and the toothed wheel 12.

As is conventional, in operation, oil or another servo-medium is supplied under a pressure into the conduit 3 so as to have it distributed through the radial conduits 4. Through such conduits, the servo-medium will reach the interior of the annular cavity 21 included between the annular end face of the plunger 5 remote from the camshaft A, and the inner surface of the shroud 9 facing it.

Due to the pressure from the servo-medium, the plunger 5 will tend to move away from the cap 9 against the returning force applied by the coil spring 15.

As we have seen, the plunger 5 is connected in keyed relationship to the hub 2, thereby it will be held at a fixed angular position relatively to the camshaft A.

On the other hand, owing to the presence of the helical toothings 10 and 11 between the plunger 5 and the shroud 8, the axial translation of the plunger 5 causes the shroud 8, cap 9, and hence the wheel 12 to rotate relatively to the hub 2 and the camshaft A. This rotational movement corresponds to a change of the relative angular position (and, therefore, of the so-called timing) of the camshaft A and the crankshaft driving the belt B trained around the toothed wheel 12.

The direction of that change will evidently depend on the direction of the toothing 10 and 11, and the extent of the timing displacement is jointly identified by the pitch of the toothing 10, 11 and the extent of the movement of the plunger 5.

In FIG. 4, there is shown a modified embodiment of the timing variator of this invention, generally indicated at 100. Similar parts carry the same reference numerals as in the previous Figures.

With the variator 100, unlike the previous example, the case 8, 9 is locked axially relatively to the hub 2 by a second retainer ring 119 provided close against the flange 18 such that said flange will be sandwiched between the rings 19 and 119.

This expedient affords simplified machining of the bottom 9b of the blind bore 9a, which by no longer providing a front abutment for positioning the case relatively to the hub, can now be machined to wider tolerances.

In addition, the toothed wheel 12 is secured directly on the shroud 8 of the case, and the cap 9 is received inside said shroud and joined thereto by a laser weldment at the inside diameter of the shroud 8. In this way, the weldment joining the cap to the shroud is not stressed by the toothed wheel 12 driving, inasmuch as the torque is transferred directly between the case 8 and the toothing 10, 11.

Understandably, with due consideration to the invention principle, the details of make and embodiments may be largely altered with respect to what has been described and illustrated without, by so doing, departing from the scope of this invention.

What is claimed is:

1. A timing variator adapted to intervene, in use, between a shaft and a drive associated therewith, comprising:

a hub adapted to be coupled to said shaft, an annular plunger fitted over said hub for axial translation over the hub, an outer case surrounding said annular plunger to define relatively to the annular plunger at least one supply volume for a timing variator working servo-medium; said outer case being provided with means of coupling it to said drive, toothed coupling means arranged between said hub and said annular plunger as well as between said annular plunger and said outer case, thereby causing, as a result of the longitudinal movement of the annular plunger relatively to said hub, a change in the relative angular positions of said hub and said outer case, said outer case has a fully enveloping configuration with respect to said hub so as to provide complete isolation from the outside of said supply volume for said servo-medium, said outer case comprises a cylindrical shroud portion encircling said annular plunger and a cap portion which covers the end of said hub remotely located, in use, from said shaft, said shroud portion and said cap portion are connected to each other by welding means.

2. A timing variator according to claim 1, characterized in that said shroud portion (8) and said cap portion are connected to each other at said supply volume (21) for said servo-medium.

3. A timing variator according to claim 1, characterized in that said shroud portion (8) and said cap portion are connected to each other along a toroidal surface having a stepped profile (89) and being defined by respective shoulders of the shroud portion (8) and the cap portion (9).

4. A timing variator according to claim 1, characterized in that said welding means are only present on the portion of said stepped profile (89) facing outwards from the case (8,9).

5. A timing variator according to claim 1, characterized in that said cap portion (9) is provided with an axial blind bore (9a) constituting a seat for receiving, supporting, and axially constraining a respective end of said hub (2).

6. A timing variator according to claim 1, characterized in that said cap portion (9) is provided externally with a flange (14) carrying attachment formations (14) for a toothed wheel.

7. A timing variator according to claim 6, characterized in that said cap portion carries further gripping formations (13a) for a tool for mounting the variator to said shaft (A).

8. A timing variator according to claim 7, characterized in that said further formation are holes (13a).

9. A timing variator according to claim 1, characterized in that it comprises elastic return means (15) acting between said hub (2) and said annular plunger (5) in the return direction of said annular plunger (5) opposite from the direction of movement of the annular plunger (5) as induced by said working servo-medium.

10. A timing variator according to claim 9, characterized in that the elastic means comprise a coil spring (15) fitted over the hub (2).

11. A timing variator according to claim 1, characterized in that it comprises elastic retainer means (19) effective to provide an axial constraint action on said hub (2) in the opposite direction from the direction of removal of said hub (2) from said outer case (8,9).

12. A timing variator according to claim 11, characterized in that said elastic retainer means (19) comprise an annular structure contractable radially and acting from within a groove (20) on said outer case (8,9) and adapted, in use, to encircle said shaft (A), said annular structure (19) having an inside diameter (19a) which is marginally larger than the diameter of said shaft (A) for the purpose of preventing the uncoupling of said annular structure (19) from said case.

* * * * *